United States Patent
Hara et al.

(10) Patent No.: US 8,117,840 B2
(45) Date of Patent: Feb. 21, 2012

(54) ABNORMALITY-DETERMINING DEVICE AND METHOD FOR TURBO-SUPERCHARGER, AND ENGINE CONTROL UNIT

(75) Inventors: Hirofumi Hara, Saitama-ken (JP); Masaki Tsuda, Saitama-ken (JP)

(73) Assignee: Honda Motor Co., Ltd., Tokyo (JP)

( * ) Notice: Subject to any disclaimer, the term of this patent is extended or adjusted under 35 U.S.C. 154(b) by 851 days.

(21) Appl. No.: 12/047,575

(22) Filed: Mar. 13, 2008

(65) Prior Publication Data
US 2008/0223036 A1 Sep. 18, 2008

(30) Foreign Application Priority Data
Mar. 15, 2007 (JP) .................. 2007-066411

(51) Int. Cl.
*F02D 23/00* (2006.01)
*F02B 39/16* (2006.01)
(52) U.S. Cl. ................. 60/601; 60/602; 701/102
(58) Field of Classification Search ....... 123/559.1–566; 60/597–612; 701/102, 100; F02B 39/16
See application file for complete search history.

(56) References Cited

U.S. PATENT DOCUMENTS

| | | | | |
|---|---|---|---|---|
| 4,492,203 A | * | 1/1985 | Yutaka | 60/601 |
| 4,774,812 A | * | 10/1988 | Hitomi et al. | 60/601 |
| 4,891,947 A | * | 1/1990 | Kishi et al. | 60/602 |
| 4,907,409 A | * | 3/1990 | Inoue et al. | 60/602 |
| 4,926,640 A | * | 5/1990 | Kazuo et al. | 60/602 |
| 4,928,489 A | * | 5/1990 | Inoue et al. | 60/602 |
| 4,970,864 A | * | 11/1990 | Kazuo et al. | 60/602 |
| 4,977,743 A | * | 12/1990 | Aihara et al. | 60/605.3 |
| 4,977,862 A | * | 12/1990 | Aihara et al. | 123/41.12 |
| 5,187,935 A | * | 2/1993 | Akiyama et al. | 60/602 |
| 5,224,853 A | * | 7/1993 | Kazuo et al. | 60/602 |
| 6,457,461 B1 | * | 10/2002 | Romzek | 123/568.16 |
| 6,694,734 B2 | * | 2/2004 | Akao et al. | 60/605.1 |
| 6,769,255 B2 | * | 8/2004 | Nishiyama et al. | 60/602 |
| 6,990,813 B2 | * | 1/2006 | Ando et al. | 60/602 |

(Continued)

FOREIGN PATENT DOCUMENTS
JP 03043644 A * 2/1991
(Continued)

OTHER PUBLICATIONS
Machine Translation of Kajiura Shiro et al. (Pub. No. JP 2006-046246 A), Published on Feb. 16, 2006.*

(Continued)

*Primary Examiner* — Thai Ba Trieu
(74) *Attorney, Agent, or Firm* — Arent Fox LLP

(57) ABSTRACT

An abnormality-determining device for a turbo-supercharger, which is capable of detecting abnormalities, including response delay of a movable member, with accuracy. A turbo-supercharger provided in an internal combustion engine has variable vanes 8c arranged in an exhaust turbine, for changing an area of a nozzle thereof. An abnormality-determining device stops supply of fuel to the engine, when the engine is in a predetermined operating condition, actuates the variable vanes, after actuating the same toward one of an open side and a closed side, toward the other of the sides, during the stoppage of fuel supply, detects a supercharging parameter indicative of a degree of supercharging by the turbo-supercharger, and determines abnormality of the turbo-supercharger based on a change in the supercharging parameter detected during the actuation of the movable vanes.

10 Claims, 5 Drawing Sheets

U.S. PATENT DOCUMENTS

| | | | |
|---|---|---|---|
| 7,296,561 B2 * | 11/2007 | Shirakawa et al. | 60/602 |
| 7,353,102 B2 * | 4/2008 | Narita et al. | 701/102 |
| 7,500,363 B2 * | 3/2009 | Hara et al. | 60/602 |
| 7,509,210 B2 * | 3/2009 | Tsuda et al. | 701/114 |
| 7,677,227 B2 * | 3/2010 | Sagisaka et al. | 60/600 |
| 7,685,810 B2 * | 3/2010 | Hirata et al. | 123/479 |
| 7,698,931 B2 * | 4/2010 | Hanari et al. | 73/114.43 |
| 2003/0084886 A1 * | 5/2003 | Akao et al. | 123/559.1 |
| 2007/0079601 A1 * | 4/2007 | Hirata et al. | 60/286 |
| 2007/0163258 A1 * | 7/2007 | Narita et al. | 60/612 |
| 2008/0209990 A1 * | 9/2008 | Hanari et al. | 73/114.38 |
| 2008/0306648 A1 * | 12/2008 | Takahashi | 701/29 |
| 2010/0236531 A1 * | 9/2010 | Shimizu et al. | 123/564 |
| 2010/0250101 A1 * | 9/2010 | Kawabe et al. | 701/104 |
| 2010/0294253 A1 * | 11/2010 | Kawase et al. | 123/568.16 |
| 2011/0005223 A1 * | 1/2011 | Kawabe et al. | 60/606 |
| 2011/0023828 A1 * | 2/2011 | Kawabe et al. | 123/445 |

FOREIGN PATENT DOCUMENTS

| | | | |
|---|---|---|---|
| JP | 10047071 A | * | 2/1998 |
| JP | 2000-265846 A | | 9/2000 |
| JP | 2003120304 A | * | 4/2003 |
| JP | 2005-273568 A | | 10/2005 |
| JP | 2006-046246 A | | 2/2006 |

OTHER PUBLICATIONS

Machine Translation of Takahashi Nobuyuki et al. (Pub. No. JP 2005-273568 A), Published on Oct. 6, 2005.*

Machine Translation of Tabata Masakazu (Pub. No. JP 2000-265846A), Published on Sep. 26, 2000.*

Machine Translation of Akita Koichi et al. et al. (Pub. No. JP 10-047071 A), Published on Feb. 17, 1998.*

Machine Translation of Akao Yoshiyuki et al. (Pub. No. JP 2003-120304A), Published on Apr. 23, 2003.*

* cited by examiner

ABNORMALITY-DETERMINING DEVICE AND METHOD FOR TURBO-SUPERCHARGER, AND ENGINE CONTROL UNIT

BACKGROUND OF THE INVENTION

1. Field of the Invention

The present invention relates to an abnormality-determining device and method for a turbo-supercharger that is provided in an internal combustion engine and has a movable member provided in an exhaust turbine thereof, for changing the area of a nozzle thereof, and an engine control unit.

2. Description of the Related Art

Conventionally, there has been proposed an abnormality-determining device of this kind in Japanese Laid-Open Patent Publication (Kokai) No. 2006-46246. This turbo-supercharger has an exhaust turbine provided in an exhaust passage of an internal combustion engine, and an intake air compressor provided in an intake passage and coaxially connected to the exhaust turbine. The exhaust turbine has a nozzle having a variable nozzle provided as a movable member. The boost pressure is controlled by actuating the variable nozzle e.g. by an actuator to vary the opening of the variable nozzle.

Further, the abnormality-determining device holds the variable nozzle at a predetermined opening degree e.g. at a fully-closed opening degree, during stoppage of the fuel supply to the engine, and determines whether or not the boost pressure detected in this state is within a predetermined pressure range. Then, if the detected boost pressure continues to be outside the predetermined pressure range for not shorter than a predetermined time period, the abnormality-determining device determines that the variable nozzle is faulty.

As described above, the conventional abnormality-determining device determines abnormality of the variable nozzle depending on whether the boost pressure detected with the variable nozzle held at the predetermined opening degree, e.g. the fully-closed opening, has turned out to be outside the predetermined pressure range. Although this makes it possible to determine abnormality of the variable nozzle when the variable nozzle is at the predetermined opening degree, e.g. at the fully-closed opening, if the variable nozzle suffers from the abnormality of the response delay, for example, the boost pressure turns out to reach the predetermined pressure range, and hence it is impossible to determine the abnormality of the response delay which the variable nozzle suffers from.

SUMMARY OF THE INVENTION

It is an object of the present invention to provide an abnormality-determining device and method for a turbo-supercharger and an engine control unit which are capable of detecting abnormalities, including response delay of a movable member, with accuracy.

To attain the above object, in a first aspect of the present invention, there is provided an abnormality-determining device for a turbo-supercharger that is provided in an internal combustion engine and has a variable member provided in an exhaust turbine, for changing an area of a nozzle thereof, comprising fuel supply-stopping means for stopping supply of fuel to the engine, when the engine is in a predetermined operating condition, movable member-actuating means for actuating the movable member toward one of an open side and a closed side, and then toward the other of the open side and the closed side, during the stoppage of the fuel supply by the fuel supply-stopping means, supercharging parameter-detecting means for detecting a supercharging parameter indicative of a degree of supercharging by the turbo-supercharger, and abnormality-determining means for determining abnormality of the turbo-supercharger based on a change in the supercharging parameter detected during actuation of the movable member by the movable member-actuating means.

The turbo-supercharge has a movable member in an exhaust turbine, for changing the area of a nozzle, and by varying the opening degree of the movable member, the degree of supercharging is varied to thereby control the supercharging pressure. With the configuration of the abnormality-determining device according to the first aspect of the present invention, during stoppage of fuel supply to the engine, the movable member-actuating means forcibly actuates the movable member toward one of the open side and the closed side, and then forcibly actuates the movable member toward the other of the sides. Further, the supercharging parameter-detecting means detects the supercharging parameter indicative of a degree of supercharging by the turbo-supercharger. Then, based on a change in the supercharging parameter detected during the actuation of the movable member, an abnormality of the turbo-supercharger is determined.

As described above, the abnormality determination of the turbo-supercharger is carried out based on a change in the supercharging parameter detected when the movable member is first actuated toward one of the open side and the closed side, and then switched to the other of the sides, it is possible to accurately determine the abnormality of the turbo-charger, including the response delay of the movable member, based on an actual change in the degree of supercharging occurring upon switching of the direction of the actuation. Further, since the abnormality determination is executed during stoppage of the fuel supply to the engine, it is possible to eliminate influence of a disturbance caused by combustion of the engine on the boost pressure, which makes it possible to enhance the accuracy of the determination.

Preferably, the supercharging parameter is at least one of an exhaust pressure on an upstream side of the exhaust turbine, an intake air pressure on a downstream side of an intake air compressor driven by the exhaust turbine, and an intake air amount.

As the degree of supercharging by the turbo-supercharger is higher, all of the exhaust pressure on the upstream side of the exhaust turbine, the intake air pressure on the downstream side of the intake air compressor, and the intake air amount become higher. That is, these three parameters serve as excellent indexes indicative of the degree of supercharging by the turbo-supercharger. Therefore, by using at least one of these parameters, it is possible to properly carry out the abnormality determination of the turbo-supercharger.

Preferably, the engine is provided with an exhaust gas recirculation device that recirculates exhaust gases from an exhaust system to an intake system, and the abnormality-determining device further comprising exhaust gas recirculation-stopping means for stopping an operation of the exhaust gas recirculation device during abnormality determination of the turbo-supercharger by the abnormality-determining means.

With the configuration of the preferred embodiment, the recirculation of exhaust gases by the exhaust gas recirculation device is stopped during abnormality determination, and therefore, it is possible to prevent fluctuation of boost pressure caused by recirculation of exhaust gases, which makes it possible to enhance the accuracy of the abnormality determination.

To attain the above object, in a second aspect of the present invention, there is provided a method of determining an abnormality of a turbo-supercharger that is provided in an internal combustion engine and has a variable member provided in an exhaust turbine, for changing an area of a nozzle thereof, comprising a fuel supply stoppage step of stopping supply of fuel to the engine, when the engine is in a predetermined operating condition, a movable member-actuating step of actuating the movable member toward one of an open side and a closed side, and then toward the other of the open side and the closed side, during the stoppage of the fuel supply in the fuel supply stoppage step, a supercharging parameter-detecting step of detecting a supercharging parameter indicative of a degree of supercharging by the turbo-supercharger, and an abnormality-determining step of determining abnormality of the turbo-supercharger based on a change in the supercharging parameter detected during actuation of the movable member in the movable member-actuating step.

With the configuration of the method according to the second aspect of the present invention, it is possible to obtain the same advantageous effects as provided by the first aspect of the present invention.

Preferably, the supercharging parameter is at least one of an exhaust pressure on an upstream side of the exhaust turbine, an intake air pressure on a downstream side of an intake air compressor driven by the exhaust turbine, and an intake air amount.

Preferably, the engine is provided with an exhaust gas recirculation device that recirculates exhaust gases from an exhaust system to an intake system, and the method further comprises an exhaust gas recirculation-stopping step of stopping an operation of the exhaust gas recirculation device during abnormality determination of the turbo-supercharger in the abnormality-determining step.

With the configurations of these preferred embodiments, it is possible to obtain the same advantageous effects as provided by the respective corresponding preferred embodiments of the first aspect of the present invention.

To attain the above object, in a third aspect of the present invention, there is provided an engine control unit including a control program for causing a compute to execute a method of determining an abnormality of a turbo-supercharger that is provided in an internal combustion engine and has a variable member provided in an exhaust turbine, for changing an area of a nozzle thereof, wherein the method comprises a fuel supply stoppage step of stopping supply of fuel to the engine, when the engine is in a predetermined operating condition, a movable member-actuating step of actuating the movable member toward one of an open side and a closed side, and then toward the other of the open side and the closed side, during the stoppage of the fuel supply in the fuel supply stoppage step, a supercharging parameter-detecting step of detecting a supercharging parameter indicative of a degree of supercharging by the turbo-supercharger, and an abnormality-determining step of determining abnormality of the turbo-supercharger based on a change in the supercharging parameter detected during actuation of the movable member in the movable member-actuating step.

With the configuration of the engine control unit according to the third aspect of the present invention, it is possible to obtain the same advantageous effects as provided by the first aspect of the present invention.

Preferably, the supercharging parameter is at least one of an exhaust pressure on an upstream side of the exhaust turbine, an intake air pressure on a downstream side of an intake air compressor driven by the exhaust turbine, and an intake air amount.

Preferably, the engine is provided with an exhaust gas recirculation device that recirculates exhaust gases from an exhaust system to an intake system, and the method further comprises an exhaust gas recirculation-stopping step of stopping an operation of the exhaust gas recirculation device during abnormality determination of the turbo-supercharger in the abnormality-determining step.

With the configurations of these preferred embodiments, it is possible to obtain the same advantageous effects as provided by the respective corresponding preferred embodiments of the first aspect of the present invention.

The above and other objects, features, and advantages of the present invention will become more apparent from the following detailed description taken in conjunction with the accompanying drawings.

DETAILED DESCRIPTION OF PREFERRED EMBODIMENTS

Figure 1:
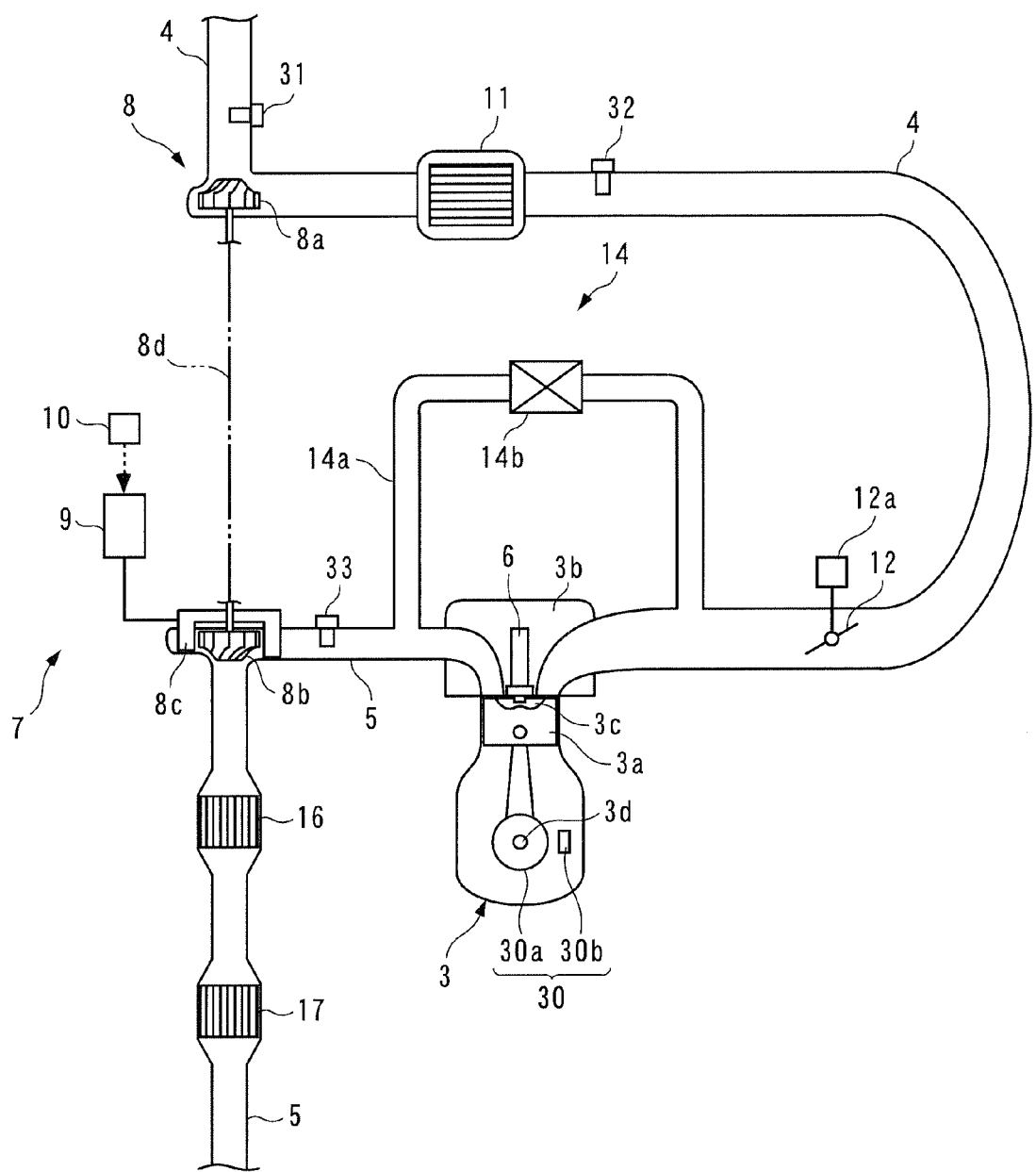
FIG. 1 is a schematic diagram of an internal combustion engine to which the present invention is applied.

The invention will now be described in detail with reference to the drawings showing preferred embodiment thereof. FIG. 1 shows an internal combustion engine to which the present invention is applied. The internal combustion engine (hereinafter simply referred to as "the engine") 3 is a diesel engine that has e.g. four cylinders (only one of which is shown), and is installed on a vehicle, not shown.

A combustion chamber 3c is defined between a piston 3a and a cylinder head 3b for each cylinder of the engine 3. The cylinder head 3b has an intake pipe 4 and an exhaust pipe 5 connected thereto, with a fuel injection valve (hereinafter referred to as "the injector") 6 mounted therethrough such that it faces the combustion chamber 3c.

Figure 2:
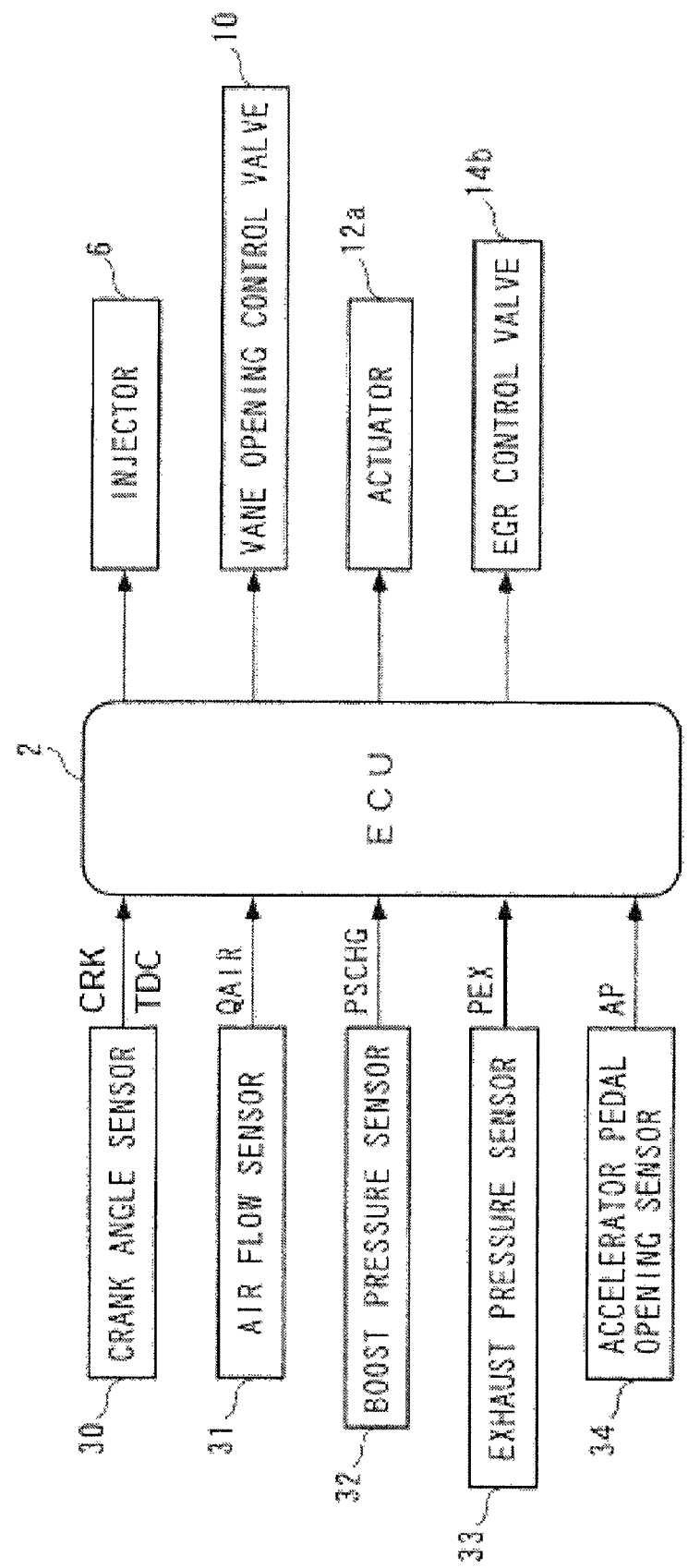
FIG. 2 is a block diagram showing signals input to and output from an ECU.

The injector 6 is inserted into the combustion chamber 3c through a central portion of the top wall thereof, and is connected to a high-pressure pump and a fuel tank, neither of which is shown, in the mentioned order via a common rail. A fuel injection amount TOUT of fuel injected from the injector 6 is controlled by controlling a time period over which the injector 6 is opened by a drive signal from the ECU 2 (see FIG. 2).

A magnet rotor 30a is mounted on a crankshaft 3d of the engine 3. The magnet rotor 30a and an MRE pickup 30b form a crank angle sensor 30 which delivers a CRK signal and a TDC signal, which are both pulse signals, to the ECU 2 along with rotation of the crankshaft 3d.

Each pulse of the CRK signal is generated whenever the crankshaft 3d rotates through a predetermined crank angle (e.g. 30°). The ECU 2 calculates rotational speed (hereinafter referred to as "the engine speed") NE of the engine 3 based on the CRK signal. The TDC signal indicates that the piston 3a of each cylinder is at a predetermined crank angle position in the vicinity of the top dead center (TDC) at the start of the suction stroke thereof, and in the case of the four-cylinder engine of the illustrated example, it is delivered whenever the crankshaft 3d rotates through 180 degrees.

The engine 3 has a turbo-supercharger 7 disposed therein. The turbo-supercharger 7 (hereinafter referred to as "supercharger 7") is comprised of a supercharger main unit 8, an actuator 9 connected to the supercharger main unit 8, and a vane opening control valve 10 connected to the actuator 9.

The supercharger main unit 8 includes an intake compressor 8a rotatably mounted in the intake pipe 4, a rotatable exhaust turbine 8b provided in the exhaust pipe 5, and a shaft 8d integrally formed with the two 8a and 8b such that the shaft 8d connects them. In the supercharger main unit 8, as the exhaust turbine 8b is driven for rotation by exhaust gases flowing through the exhaust pipe 5, the intake compressor 8a integrally formed with the exhaust turbine 8b is also rotated, whereby the supercharger main unit 8 is caused to perform a supercharging operation for pressurizing intake air in the intake pipe 4.

Further, a plurality of variable vanes 8c (only two of which are shown) are provided in a nozzle (not shown) of the exhaust turbine 8b, and these variable vanes 8c are connected to the actuator 9.

The actuator 9 is of a diaphragm type which is operated by negative pressure. The actuator 9 has negative pressure supplied from a negative pressure pump, not shown, through a negative pressure supply passage, not shown. The vane opening control valve 10 is disposed in an intermediate portion of the negative pressure supply passage. The vane opening control valve 10 is formed by an electromagnetic valve, and the degree of opening thereof is controlled by a drive signal from the ECU 2, whereby negative pressure to be supplied to the actuator 9 is changed to change the degree of opening of each variable vane 8c. Thus, by varying the area of the nozzle of the exhaust turbine 8b, the degree of supercharging by the supercharger 7 is varied, whereby the boost pressure is controlled.

An intercooler 11 of a water cooling type, and a throttle valve 12 are inserted into the intake pipe 4 at respective locations downstream of the intake compressor 8a from upstream to downstream in the mentioned order. The intercooler 11 is provided for cooling intake air e.g. when the temperature of the intake air is made higher by the supercharging operation of the supercharger 7. An actuator 12a comprised e.g. of a DC motor is connected to the throttle valve 12. The opening of the throttle valve 12 is controlled by controlling the duty factor of electric current supplied to the actuator 12a by the ECU 2.

Further, the intake pipe 4 has an air flow sensor 31 inserted therein at a location upstream of the intake compressor 8a, and a boost pressure sensor 32 inserted therein between the intercooler 11 and the throttle valve 12. The air flow sensor 31 detects the intake air amount QAIR, to deliver a signal indicative of the sensed intake air amount QAIR to the ECU 2, while the boost pressure sensor 32 detects intake pressure on the downstream side of the intake compressor 8a as boost pressure PSCHG, to deliver a signal indicative of the sensed boost pressure PSCHG to the ECU 2.

Further, the engine 3 is provided with an EGR device 14 that has an EGR pipe 14a and an EGR control valve 14b. The EGR pipe 14a connects between a portion of the intake pipe 4 at a location downstream of the throttle valve 12 and a portion of the exhaust pipe 5 at a location upstream of the exhaust turbine 8b. Part of exhaust gases exhausted from the engine 3 is recirculated into the intake pipe 4 via the EGR pipe 14a as EGR gases.

The EGR control valve 14b is implemented by a linear solenoid valve inserted into the EGR pipe 14a, and the valve lift amount thereof is controlled by a duty-controlled drive signal from the ECU 2, whereby the amount of EGR gases is controlled.

A three-way catalyst 16 and a NOx catalyst 17 are provided in the exhaust pipe 5 at respective locations downstream of the exhaust turbine 8b from upstream to downstream in the mentioned order. The three-way catalyst 16 oxidizes HC and CO and performs reduction of NOx in exhaust gases under a stoichiometric atmosphere, to thereby purify i.e. reduce exhaust emissions. The NOx catalyst 17 traps NOx contained in exhaust gases under an oxidizing atmosphere in which the concentration of oxygen is high, and under a reducing atmosphere in which large amounts of reducing agents are contained in the exhaust gases, the NOx catalyst 17 performs reduction of the trapped NOx, to thereby purify exhaust emissions.

Furthermore, an exhaust pressure sensor 33 is provided in the exhaust pipe 5 at a location upstream of the exhaust turbine 8b. The exhaust pressure sensor 33 detects pressure of exhaust gases on the upstream side of the exhaust turbine 8b as exhaust pressure PEX, and delivers a signal indicative of the detected exhaust pressure PEX to the ECU 2. Further, an accelerator pedal opening sensor 34 detects the amount AP of operation (stepped-on amount) of an accelerator pedal, not shown (hereinafter referred to as "the accelerator pedal opening AP"), and delivers a signal indicative of the sensed accelerator pedal opening AP to the ECU 2.

The ECU 2 forms fuel supply-stopping means, variable member-actuating means, abnormality-determining means, and exhaust gas recirculation-stopping means, and is implemented by a microcomputer comprised of an I/O interface, a CPU, a RAM, and a ROM (none of which are specifically shown). The detection signals from the aforementioned sensors 30 to 34 are input to the CPU after the I/O interface performs A/D conversion and waveform shaping thereon.

Further, in response to these input signals, the CPU determines an operating condition of the engine 3, and based on the determined operating condition of the engine, performs engine control, such as control of the fuel injection amount and the intake air amount, in accordance with control programs read from the ROM. Further, the CPU executes a decelerating fuel cut-off (F/C) operation in which the supply of fuel to the engine 3 is stopped, when the engine 3 is in a predetermined deceleration condition e.g. in which the accelerator opening AP is approximately equal to 0, and at the same time, the engine speed NE is not lower than a predetermined rotational speed (e.g. 1000 rpm), and executes abnormality determination of the supercharger 7 (hereinafter simply referred to as "the abnormality determination") during the decelerating F/C operation.

Figure 3:
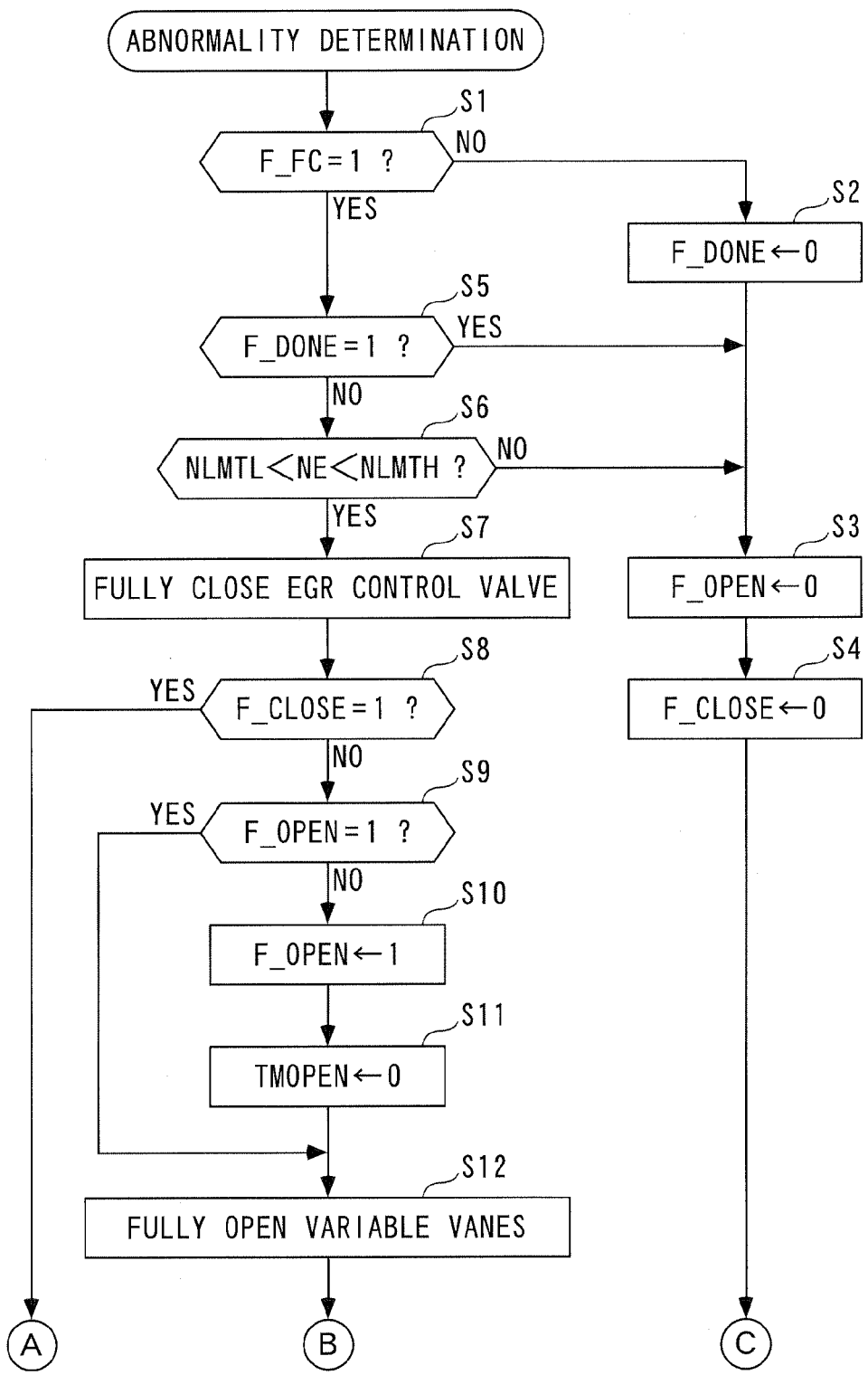
FIG. 3 is a flowchart of a process for determining abnormality of a turbo-supercharger.
Figure 4:
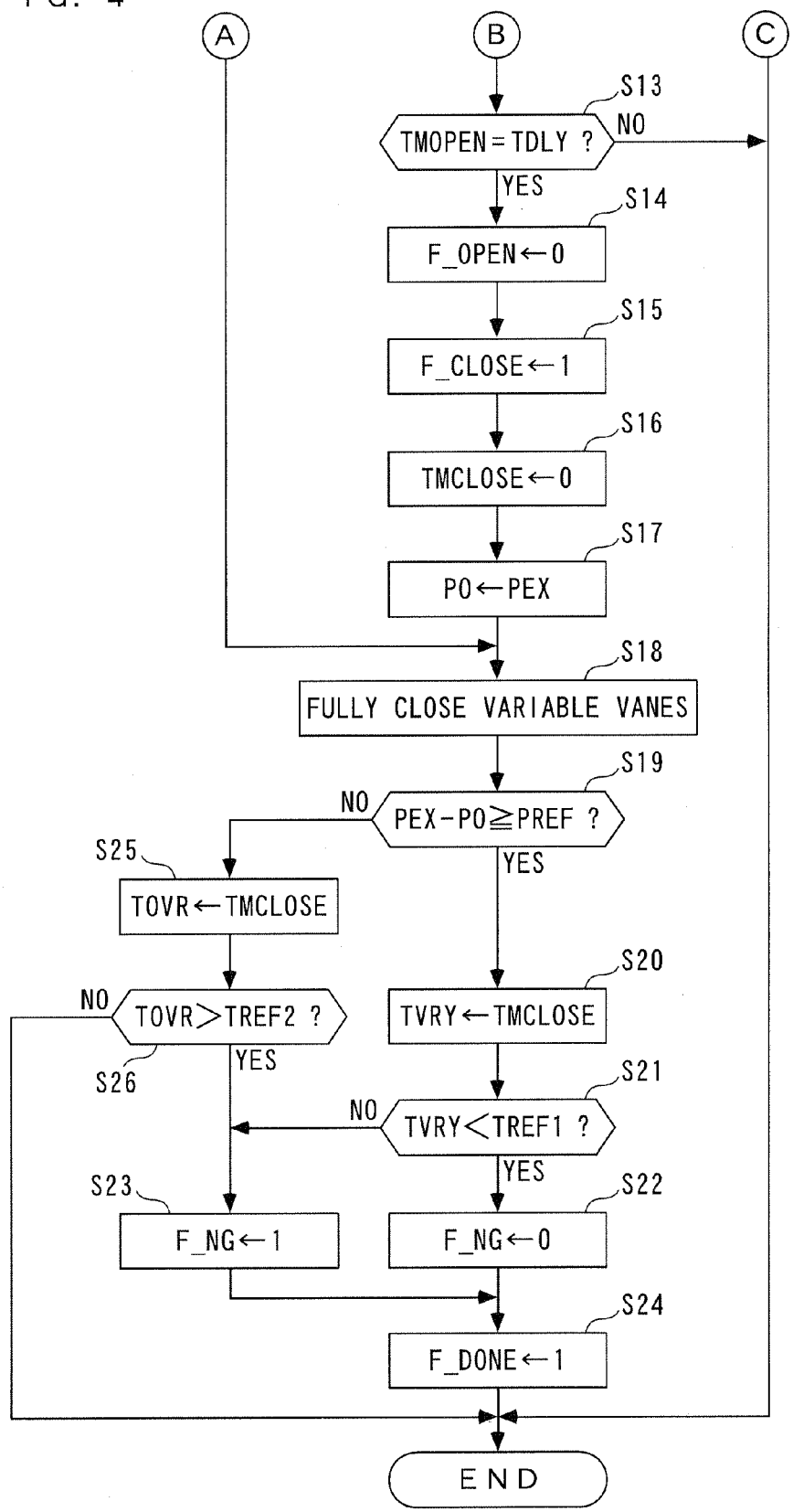
FIG. 4 is a continuation of the FIG. 3 flowchart.

FIGS. 3 and 4 are flowcharts showing a process for determining abnormality of the supercharger 7. This process is executed whenever a predetermined time period elapses. In the present process, first, it is determined in a step 1 (shown as S1 in abbreviated form in FIG. 3; the following steps are also shown in abbreviated form) whether or not a fuel cut-off flag F_FC is equal to 1. If the answer to this question is negative (NO), i.e. if the engine 3 is not in decelerating F/C operation, a determination completion flag F_DONE, referred to hereinafter, is set to 0 (step 2), and at the same time, a vane fully-opening flag F_OPEN and a vane fully-closing flag F_CLOSE are both set to 0 (steps 3 and 4), followed by terminating the present process.

If the answer to the question of the step 1 is affirmative (YES), i.e. the engine 3 is in decelerating F/C operation, it is determined whether or not the determination completion flag F_DONE is equal to 1 (step 5). If the answer to this question is affirmative (YES), i.e. if the abnormality determination has been completed during the present decelerating F/C operation, it is judged that the abnormality determination should not be executed any further, and hence the steps 3 and 4 are carried out, followed by terminating the present process.

If the answer to the question of the step 5 is negative (NO), i.e. if the abnormality determination has not been completed during the present decelerating F/C operation, it is determined whether or not the engine speed NE is within a range defined by a predetermined lower limit value NLMTL (e.g. 1000 rpm) and a predetermined upper limit value NLMTH (e.g. 1500 rpm) (step 6). If the answer to this question is negative (NO), i.e. the engine speed NE is not within the predetermined range, it is judged that the abnormality-executing conditions are not satisfied, so that the steps 3 and 4 are executed, followed by terminating the present process.

If the answer to the question of the step 6 is affirmative (YES), i.e. if the engine speed is within the predetermined range/it is judged that the abnormality determination-executing conditions are satisfied, so that the abnormality determination is executed in a step 7 and the following.

First, in the step 7, by actuating the EGR control valve 14b to a fully-closed opening degree, whereby the recirculation of EGR gases by the EGR device 14 is stopped. Then, it is determined whether or not the vane fully-closing flag F_CLOSE and the vane fully-opening flag F_OPEN are equal to 1 (steps 8 and 9). If both of the answers to these questions are negative (NO), the vane fully-closing flag F_OPEN is set to 1 (step 10), and a timer value TMOPEN of an upcount fully-open state timer (hereinafter referred to as "the fully-open state timer") is set to 0 (step 11). Further, the variable vanes 8c of the supercharger 7 are actuated to a substantially fully-open degree (step 12).

After the step 10 is executed, the answer to the question of the step 9 becomes affirmative (YES). Therefore, in this case, the steps 10 and 11 are skipped, and the process proceeds to the step 12 to continue the fully-opening control of the variable vanes 8c.

In a step 13 following the step 12, it is determined whether or not the fully-open state timer TMOPEN is equal to a predetermined time period TDLY (e.g. two seconds), if the answer to this question is negative (NO), the present process is immediately terminated. On the other hand, if the answer to the question of the step S13 is affirmative (YES), i.e. if the predetermined time period TDLY has elapsed after the start of the fully-opening control of the variable vanes 8c, it is judged that the exhaust pressure PEX by the fully-opening control has been stabilized, so that the vane fully-open state flag F_OPEN is rest to 0 (step 14), and the fully-closing control of the variable vanes 8c is executed in a step 15 and the following.

More specifically, the vane fully-closing flag F_CLOSE is set to 1 (step 15), and a time value TMCLOSE of an upcount fully-closed state timer (hereinafter referred to as "the fully-closed state timer") is rest to 0 (step 16). At the same time, the exhaust pressure PEX at this time is stores as an initial pressure P0 at the start of the fully-closing control (step 17), and the variable vanes 8c are actuated to a substantially fully-closed opening degree (step 18).

After execution of the step 15, the answer to the question of the step 8 becomes affirmative (YES). Therefore, in this case, the steps 9 to 17 are skipped, and the process proceeds to the step 18, to continue the fully-closing control of the variable vanes 8c.

In a step 19 following the step 18, it is determined whether or not the differential pressure (PEX−P0) between the initial pressure P0 of the exhaust pressure stored in the step 17 and the exhaust pressure PEX at the present time is equal to not lower than a predetermined value PREF.

If the answer to the question of the step 19 is affirmative (YES), the fully-closed state timer value TMCLOSE is set as a required time period TVRY which the differential pressure (PEX−P0) took to reach the predetermined value PREF (step 20), and it is determined whether or not the set required time period TVRY is smaller than a first predetermined time period TREF1 (e.g. two seconds) (step S21).

If the answer to this question is affirmative (YES), i.e. if TVRY<TREF1 holds, the exhaust pressure PEX is fast in rising after the start of the fully-closing control of the variable vanes 8c, and hence it is judged that the supercharger 7 is normal, so that an abnormality flag F_NG is set to 0 (step 22).

On the other hand, if the answer to the question of the step 21 is negative (NO), i.e. if TVRY≧TREF1 holds, the exhaust pressure PEX is slow in rising after the start of the fully-closing control of the variable vanes 8c, and hence it is judged that the supercharger 7 suffers from abnormality of the response delay, so that the abnormality flag F_NG is set to 1 (step 23).

In a step 24 following the step 22 or 23, to indicate that the abnormality determination is completed, the abnormality determination completion flag F_DONE is set to 1, followed by terminating the present process.

On the other hand, if the answer to the question of the step 19 is negative (NO), i.e. if the differential pressure (PEX−P0) has not reached the predetermined value PREF, the fully-closed state timer value TMCLOSE at the time is set to an elapsed time TOVR after the start of the fully-closing control of the variable vanes 8c (step 25). Then, it is determined whether or not the set elapsed time TOVR is larger than a second predetermined time period TREF2 (e.g. six seconds) longer than the first predetermined time period TREF1 (step 26).

If the answer to the question of the step 26 is negative (NO), the present process is immediately terminated, whereas if the same is affirmative (YES), i.e. even after the lapse of the second predetermined period TREF2, the differential pressure (PEX−P0) has not reached the predetermined value PREF, it is judged that the variable vanes 8c suffer from abnormality of fully-open state fixation, so that the process proceeds to the step 23, wherein the abnormality flag F_NG is set to 1, and after execution of the step 24, the present process is terminated.

Figure 5:
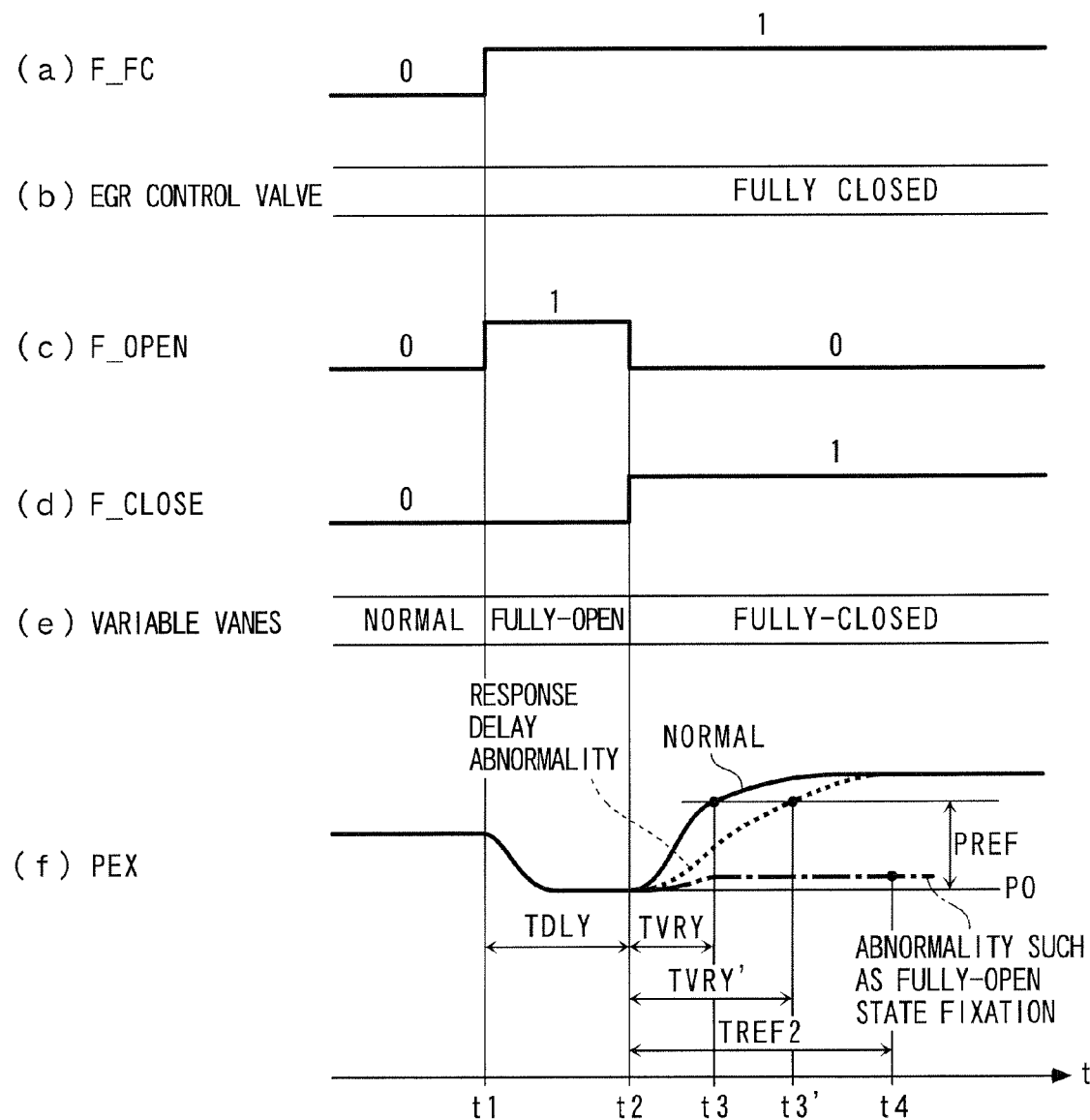
FIG. 5 is a timing diagram showing an example of operation of the abnormality-determining device obtained by execution of the abnormality-determining process.

FIG. 5 is a timing diagram showing an example of operation of the abnormality-determining device obtained by the abnormality-determining process described above. At a time t1 in FIG. 5, when the decelerating operation-executing conditions are satisfied, the fuel cut-off flag F_FC is set to 1, to start the decelerating F/C operation. If the abnormality determination-executing conditions are satisfied at this time, the EGR control valve 14b is actuated to a fully closed opening degree, to stop the recirculation of EGR gases (step 7). Further, the vane fully-opening flag F_OPEN is set to 1 (step 10), whereby the variable vanes 8c are actuated from the normally controlled state to the substantially fully-closed opening degree (step 12), thereby starting the fully-opening control. The fully-opening control increases the area of the nozzle of the exhaust turbine 8b, to reduce the degree of supercharging, thereby reducing the exhaust pressure PEX.

After the start of the fully-opening control, upon the lapse of the predetermined time period TDLY (t2), the vane fully-opening flag F_OPEN is reset to 0 (step 14), and at the same time, the vane fully-closing flag F_CLOSE is set to 1 (step 15), to thereby actuating the variable vanes 8c to the substantially fully-closed opening (step 18), whereby the fully-closing control is started. The fully-closing control narrows the nozzle of the exhaust turbine 8b, to increase the degree of supercharging, thereby increasing the exhaust pressure PEX.

With a rise in the exhaust pressure PEX, when the differential pressure (PEX−P0) between the exhaust pressure PEX and the initial pressure P0 at the start of the fully-closing control reaches the predetermined value PREF (YES to the step 19: t3), the fully-closed state timer TMCLOSE at the time is set to the required time TVRY which the exhaust pressure PEX takes to rise by the predetermined value PREF after the start of the fully-closing control (step 20).

If the variable vanes 8c of the supercharger 7 are operating without response delay, as indicated by a solid line in (f) of FIG. 5, the exhaust pressure PEX is fast in rising after the start of the fully-closing control, so that the required time TVRY calculated as described above becomes short. On the other hand, if the variable vanes 8c suffer from abnormality of the response delay, as indicated by a broken line in (f) of FIG. 5, the exhaust pressure PEX is slow in rising, so that the required time TVRY becomes longer (t3' in FIG. 5; TVRY'). Therefore, by comparing the required time TVRY with the predetermined time period TREV1, if TVRY<TREF1 holds (YES to the step 21), it can be judged that the variable vanes 8c do not suffer from the response delay, and the supercharger 7 is normal, whereas when TVRY≧TREV1 holds (NO to the step 21), it can be judged that the variable vanes 8c suffer from abnormality of the response delay.

Further, if the variable vanes 8c suffer from abnormality, such as fully-open state fixation, as indicated by a one-dot-chain line in (f) of FIG. 5, the exhaust pressure PEX does not rise or is difficult to rise, so that when TOVR>TREF2 holds (YES to the step 26), it can be judged that this kind of abnormality has occurred.

As described heretofore, according to the present embodiment, based on a manner of change in the exhaust pressure PEX occurring when fully closing the variable vanes 8c of the supercharger after executing the fully-opening control of thereof, more specifically, by comparing the required time TVRY which the exhaust pressure PEX takes to rise by the predetermined value PREF from the start of the fully-closing control with the predetermined time period TREF, it is possible to accurately determine abnormality of the supercharger 7, including the response delay of the variable vanes 8c.

Further, since the abnormality determination is executed in a state where the recirculation of EGR gases is stopped during decelerating F/C operation, it is possible to eliminating the influence of a disturbance caused by combustion of the engine or EGR gases on the boost pressure, whereby it is possible to enhance the accuracy of the determination. Further, since the fully-opening control of the variable vanes 8c is continued over the predetermined time period TDLY, and after waiting for the exhaust pressure PEX to become stable in this state, the control is shifted to the fully-closing control. Therefore, it is possible to properly determining the required time TVRY, thereby further enhancing the accuracy of the determination.

It should be noted that the present invention is by no means limited to the above-described embodiment, but it can be practices in various forms. For example, although in the embodiment, after executing the fully-opening control of the variable vanes 8c, the fully-closing control of the same is executed, the order of these controls may be reversed. In this case, by comparing the required time which the exhaust pressure PEX takes to be reduced by a predetermined value from the start of the fully-opening control with a predetermined time period, it is possible to perform abnormality determination with accuracy. Further, in the embodiment, as the control for opening the variable vanes 8c, the variable vanes 8c are actuated to be substantially fully opened, and as the control for closing the same, they are actuated to be substantially fully closed. However, insofar as the opening degree of the variable vanes 8c can cause the difference between the boost pressure on the vane-open side and that on the vane-closed side to be made clearly apparent, the variable vanes 8c may be actuated to respective opening degrees other than the fully-open opening degree and the fully-closed opening degree.

Further, in the embodiment, the abnormality determination is carried out based on the required time TVRY which the exhaust pressure PEX takes to rise after the start of the fully-closing control, any suitable manner of the abnormality determination may be employed as desired. For example, the determination may be made based on the absolute value of the exhaust pressure PEX detected when a predetermined time period has elapsed after the start of the fully-closing control or a slope of rise of the exhaust pressure PEX occurring over a predetermined time period after the start of the fully-closing control.

Further, although in the present embodiment, as supercharging parameters indicative of a degree of supercharging by the supercharger 7, the exhaust pressure PEX as pressure of exhaust gases on the upstream side of the exhaust turbine 8b is employed, instead of this, boost pressure PSCHG as pressure of intake air on the downstream side of the intake compressor 8a or the intake air amount QAIR may be employed. The boost pressure PSCHG and the intake air amount QAIR take larger values as the degree of supercharging by the supercharger 7 is higher, thereby serving as excellent indexes of the degree of supercharging. Therefore, by using them as supercharging parameters, it is possible to similarly perform the abnormality determination with accuracy. Alternatively, two or more combinations of the exhaust pressure PEX, the boost pressure PSCHG, and the intake air amount QAIR may be used, whereby it is possible to further enhance the accuracy of the abnormality determination.

Furthermore, although the supercharger 7 in the embodiment is a type using the variable vanes 8c as movable members, it is to be understood that the present invention is applicable to superchargers in which variable flaps or on-off valves disposed in a plurality of divided nozzle passages, respectively, are used as variable members.

Furthermore, the present invention may be applied not only to the diesel engine installed on a vehicle but also to a gasoline engine, such as a lean burn engine. Further, the present invention can be applied to various types of industrial internal combustion engines including engines for ship propulsion machines, such as an outboard motor having a vertically-disposed crankshaft.

It is further understood by those skilled in the art that the foregoing are preferred embodiments of the invention, and that various changes and modifications may be made without departing from the spirit and scope thereof.

What is claimed is:

1. A method of determining an abnormality of a turbo-supercharger that is provided in an internal combustion engine and has a variable member provided in an exhaust turbine, for changing an area of a nozzle thereof, comprising:
   a fuel supply stoppage step of stopping supply of fuel to the engine, when the engine is in a predetermined operating condition;
   a movable member-actuating step of forcibly actuating the movable member toward one of a substantially fully open side and a fully closed side, and then toward the other of the substantially fully open side and the fully closed side, during the stoppage of the fuel supply in said fuel supply stoppage step;
   a supercharging parameter-detecting step of detecting a supercharging parameter indicative of a degree of supercharging by the turbo-supercharger; and
   an abnormality-determining step of determining that the turbo-supercharger suffers from an abnormality of a response delay of the movable member when the detected supercharging parameter reaches a predetermined value after a lapse of a predetermined period, after an actuation of the movable member in said movable member-actuating step from one of the substantially fully open side or closed side to the other of the substantially fully open side or closed side.

2. The method as claimed in claim 1, wherein the supercharging parameter is at least one of an exhaust pressure on an upstream side of the exhaust turbine, an intake air pressure on a downstream side of an intake air compressor driven by the exhaust turbine, and an intake air amount.

3. The method as claimed in claim 1, wherein the engine is provided with an exhaust gas recirculation device that recirculates exhaust gases from an exhaust system to an intake system, and the method further comprising an exhaust gas recirculation-stopping step of stopping an operation of the exhaust gas recirculation device during abnormality determination of the turbo-supercharger in said abnormality-determining step.

4. An engine control unit including non-transitory computer-readable storage medium encoded with a computer program to execute a method of determining an abnormality of a turbo-supercharger that is provided in an internal combustion engine and has a variable member provided in an exhaust turbine, for changing an area of a nozzle thereof, wherein the method comprises:

a fuel supply stoppage step of stopping supply of fuel to the engine, when the engine is in a predetermined operating condition;

a movable member-actuating step of forcibly actuating the movable member toward one of a substantially fully open side and a fully closed side, and then toward the other of the substantially fully open side and the fully closed side, during the stoppage of the fuel supply in said fuel supply stoppage step;

a supercharging parameter-detecting step of detecting a supercharging parameter indicative of a degree of supercharging by the turbo-supercharger; and an abnormality-determining step of determining that the turbo-supercharger suffers from an abnormality of a response delay of the movable member when the detected supercharging parameter reaches a predetermined value after a lapse of a predetermined period, after an actuation of the movable member in said movable member-actuating step from one of the substantially fully open side or closed side to the other of the substantially fully open side or closed side.

5. The engine control unit as claimed in claim 4, wherein the supercharging parameter is at least one of an exhaust pressure on an upstream side of the exhaust turbine, an intake air pressure on a downstream side of an intake air compressor driven by the exhaust turbine, and an intake air amount.

6. The engine control unit as claimed in claim 4, wherein the engine is provided with an exhaust gas recirculation device that recirculates exhaust gases from an exhaust system to an intake system, and wherein the method further comprises an exhaust gas recirculation-stopping step of stopping an operation of the exhaust gas recirculation device during abnormality determination of the turbo-supercharger in said abnormality-determining step.

7. An abnormality-determining device for a turbo-supercharger that is provided in an internal combustion engine and has a variable member provided in an exhaust turbine, for changing an area of a nozzle thereof, comprising:

fuel supply-stopping means for stopping supply of fuel to the engine, when the engine is in a predetermined operating condition;

movable member-actuating means for forcibly actuating the movable member toward one of a substantially fully open side and a fully closed side for a predetermined, and then toward the other of the substantially fully open side and the fully closed side, during the stoppage of the fuel supply by said fuel supply-stopping means;

supercharging parameter-detecting means for detecting a supercharging parameter indicative of a degree of supercharging by the turbo-supercharger; and abnormality-determining means for determining that the turbo-supercharger suffers from an abnormality of a response delay of the movable member when the detected supercharging parameter reaches a predetermined value after a lapse of a first predetermined period, after an actuation of the movable member by said movable member-actuating means from one of the substantially fully open side or closed side to the other of the substantially fully open side or closed side.

8. The abnormality-determining device as claimed in claim 1, wherein the supercharging parameter is at least one of an exhaust pressure on an upstream side of the exhaust turbine, an intake air pressure on a downstream side of an intake air compressor driven by the exhaust turbine, and an intake air amount.

9. The abnormality-determining device as claimed in claim 1, wherein the engine is provided with an exhaust gas recirculation device that recirculates exhaust gases from an exhaust system to an intake system, and the abnormality-determining device further comprising exhaust gas recirculation-stopping means for stopping an operation of the exhaust gas recirculation device during abnormality determination of the turbo-supercharger by said abnormality-determining means.

10. The abnormality-determining device as claimed in claim 1, wherein said abnormality determining means determines that the turbo supercharger suffers from an abnormality of a fixation of the movable member when the detected supercharging parameter does not reach a predetermined value even after a lapse of a second predetermined period longer than the first predetermined period, after an actuation of the movable member by said movable member-actuating means from one of the substantially fully open side or closed side to the other substantially fully open side or closed side.

* * * * *